United States Patent
Thompson et al.

(10) Patent No.: US 6,655,118 B1
(45) Date of Patent: Dec. 2, 2003

(54) SUSPENSION SYSTEM

(75) Inventors: Kent Thompson, Otley, IA (US); Stuart Van Donselaar, New Sharon, IA (US); Shane Bollinger, Leighton, IA (US)

(73) Assignee: Vermeer Manufacturing Company, Pella, IA (US)

(*) Notice: Subject to any disclaimer, the term of this patent is extended or adjusted under 35 U.S.C. 154(b) by 0 days.

(21) Appl. No.: 10/217,689

(22) Filed: Aug. 13, 2002

(51) Int. Cl.$^7$ ............................................... A01D 47/00
(52) U.S. Cl. ........................................ 56/15.8; 56/208
(58) Field of Search ................................ 56/14.9, 15.1, 56/15.8, 15.9, 208, 228; 172/395, 396, 419, 427

(56) References Cited

U.S. PATENT DOCUMENTS

| | | |
|---|---|---|
| 3,355,865 A | 12/1967 | Waldrop |
| 3,474,601 A | 10/1969 | Burrough |
| 3,589,115 A | 6/1971 | Taylor |
| 3,728,851 A | 4/1973 | Van Antwerp |
| 4,099,368 A | 7/1978 | Mackert |
| RE30,056 E | 7/1979 | Halls |
| 4,177,625 A | 12/1979 | Knight |
| 4,177,627 A | 12/1979 | Cicci |
| 4,206,582 A | 6/1980 | Molzahn |
| 4,313,294 A | 2/1982 | Martenas |
| 4,473,993 A | 10/1984 | Jennings |
| 4,676,053 A | 6/1987 | Pruitt |
| 4,724,661 A | 2/1988 | Blakeslee |
| 5,060,462 A | 10/1991 | Helfer |
| 5,107,663 A | 4/1992 | Wattron |
| 5,327,709 A | 7/1994 | Webb |
| 5,337,544 A | 8/1994 | Lauritsen |
| 5,535,578 A | 7/1996 | Honey |
| 5,566,535 A | 10/1996 | Pruitt |
| 5,806,291 A | 9/1998 | Lehman |
| 6,125,619 A | 10/2000 | Wolff |
| 6,250,055 B1 | 6/2001 | Franet |
| 6,269,619 B1 | 8/2001 | Walch et al. |

OTHER PUBLICATIONS

Color Copy—2 pages (11 & 12) from publication entitled AGRARTECHNIKakrueff—the article is entitled Zuverlassig und leistungsstark (dated at the bottom 2000).
Copy—3 pages of a Mower Conditioner—FC 280 F—Spare parts list—by Kuhn S.A.—no date.

Primary Examiner—Robert E. Pezzuto
(74) Attorney, Agent, or Firm—Sturm & Fix LLP

(57) ABSTRACT

A harvesting machine with a main frame, a harvesting header having a first end and a second end and a suspension system operatively attached to the main frame for supporting the harvesting header from above, the harvesting header having a lowered position and a raised position. A suspension frame has a rocker arm operatively pivotally attached thereto along a first substantially horizontal axis, the rocker arm having an upper position and a lowermost position. A first link is operatively pivotally attached to the suspension frame along a second substantially horizontal axis and is operatively pivotally attached to the harvesting header at the other end thereof. A second link is operatively pivotally attached to the main frame along a third substantially horizontal axis and is operatively pivotally attached to the harvesting header at a fourth substantially horizontal axis, the second link being disposed substantially always parallel to the first link. A suspension lift bar is operatively pivotally attached to the rocker arm and is operatively pivotally attached to the harvesting header, the suspension lift bar (330) being disposed not parallel with respect to the first link. A biasing spring member is operatively attached to the suspension frame and is operatively attached at the other end thereof to the rocker arm for exerting a lift force on the rocker arm toward the upper position thereof. A force adjusting device on the biasing member is provided for adjusting the lift force on the harvesting header to counteract the weight of the harvesting header such that the effective ground weight of the harvesting header, less than the weight of the header, is required to lift the header upwardly and to permit the ground weight to be maintained substantially constant as the harvesting header moves between the lowered and the raised position thereof.

19 Claims, 15 Drawing Sheets

SUSPENSION SYSTEM

BACKGROUND OF THE INVENTION

TECHNICAL FIELD

The invention pertains to a suspension system for a mower conditioner header adapted for cutting crop material, preferably at a set height from the ground. The suspension system attaches the mower conditioner header to a frame. The frame can be adapted to be pulled by a towing vehicle, typically a tractor. It can also be the chassis of a self-propelled machine. In either case the header is propelled along the ground maintaining a constant clearance to cut the crop a constant height, and thus must be capable of following the topography of the ground. Suspension systems have been developed that allow headers to move relative to their supporting frames. Many patents have been granted on various aspects of these suspension mechanisms.

One critical aspect of the suspension system is the ground pressure, the force of the header against the ground. A very low ground pressure can result in excessive bouncing wherein the crop will be cut in an uneven manner whenever the header bounces off the ground, and is thus undesirable. A very high ground pressure is also undesirable as it may cause the header to gouge the ground or it may cause damage to the header when it encounters an obstacle.

Many of the prior art suspension systems have utilized extension springs to suspend a portion of the weight of the header and control the ground pressure. The most desirable ground pressure is set with the header in the operating position. As the header is raised from that position, as would happen when encountering an obstacle, the extension springs typically utilized in the suspension systems, become shorter and the ground pressure quickly increases. Many of the prior art suspension systems utilize extension springs directly connected between the frame and the header.

Mechanisms, which utilize a rocker arm, have been developed to achieve improved load characteristics. In U.S. Pat. No. 4,099,368 a rocker arm and extension spring mechanism is disclosed, mounted to the side of the header and connected to the header via cables. In U.S. Pat. No. 4,313,294 a rocker arm and extension spring mechanism is disclosed, mounted behind the header.

Both these references disclose mechanisms developed to be adapted to headers that are supported by a frame, which is located behind the header, wherein the frame effectively pushes the header along the ground.

An alternative is to support the header from the top, allowing the frame to basically pull the header over the ground an example is disclosed in U.S. Pat. No. 5,107,663 and U.S. Pat. No. 5,060,462. This suspension system offers advantages in that when the header encounters an obstacle it tends to move backwards as it is forced upwards, due to the arrangement of the supporting links. This arrangement results in limited available space for the suspension system.

There remains a need for a suspension system, adapted to a mechanism which supports a header from above, which provides improved suspension characteristics and adjustment features.

SUMMARY OF THE INVENTION

According to the present invention there is provided a suspension system for a top supported mower conditioner that provides an improved load profile while packaging all the components in an area that does not interfere with any functions of the machine. This improved load profile includes improved consistency of the ground pressure as the header moves from the lowest, operating, position to a raised, deflected position.

According to a further object of the present invention the lowest position of the header relative to the frame is easily adjusted to control the cutting height of the machine.

According to a further object of the present invention the load profile of the ground pressure is balanced, substantially equal across the width of the header, even though the header is unbalanced.

According to a further object of the present invention a shipping configuration is provided wherein the header is locked into position with the frame.

According to a further object of the present invention the orientation of the header relative to the frame is easily adjusted.

Other objects, advantages and novel features of the present invention will become apparent from the following detailed description of the invention when considered in conjunction with the accompanying drawings.

DESCRIPTION OF A PREFERRED EMBODIMENT

Figure 1:
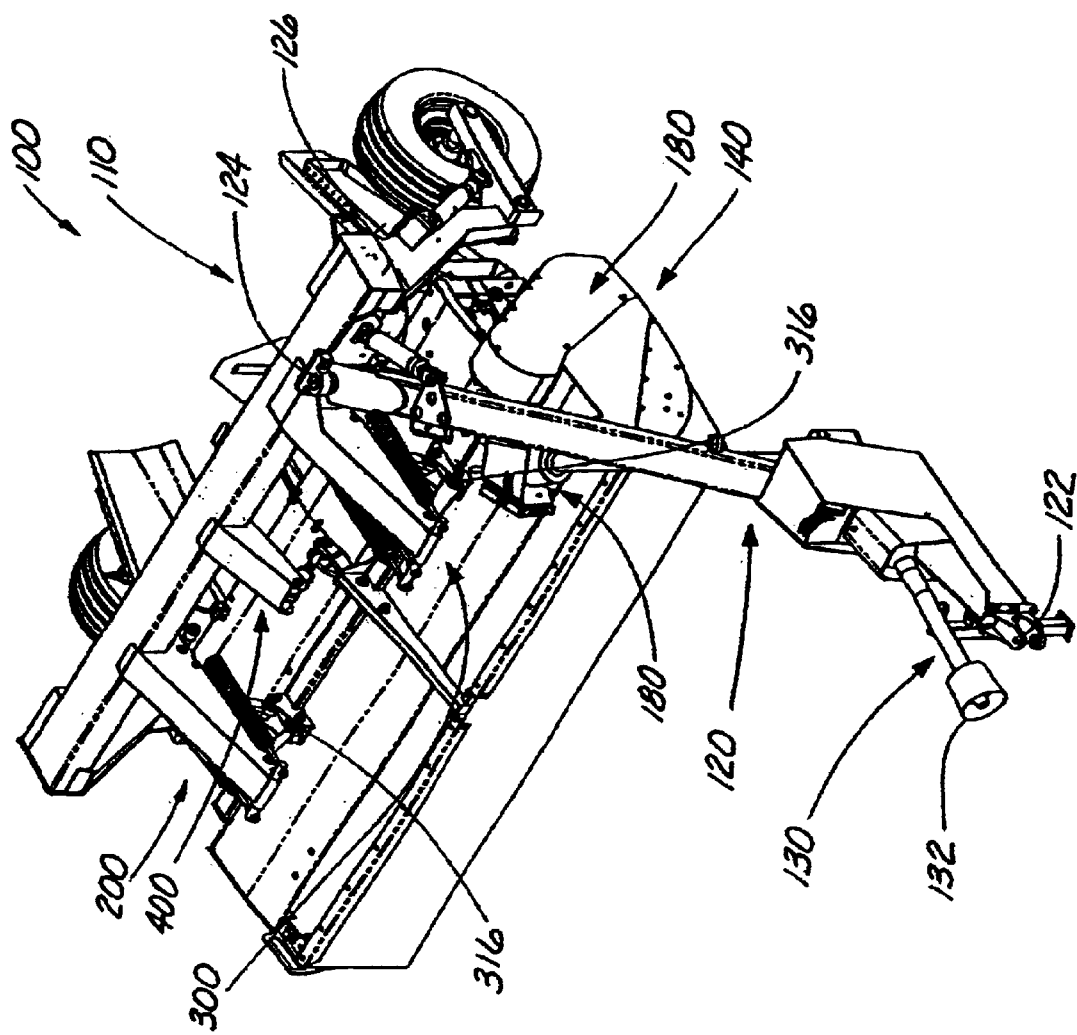
FIG. 1 is an isometric of the overall machine with header in lowered position

With reference now to the various figures in which identical elements are numbered identically throughout, a description of various exemplary aspects of the present invention will now be provided. The preferred embodiments are shown in the drawings and described with the understanding that the present disclosure is to be considered an exemplification of the invention and is not intended to limit the invention to the embodiments disclosed.

Referring now to the drawings, FIG. 1 illustrates one embodiment of the present invention, a pull-type mower conditioner 100. The basic components include a main frame assembly 110, a draft tongue 120, a drive assembly 130, a header assembly 140, a right suspension assembly 200, a left suspension assembly 300 and a center suspension assembly 400.

The draft tongue 120 is adapted to attach to a towing vehicle at hitch 122. On the opposite end it is pivotally attached to main frame assembly 110 at main pivot 124. A swing cylinder 126 is adapted to control the angular orientation of the draft tongue 120 relative to main frame assembly 110 in order to position the mower conditioner 100 in either a transport position or a mowing position. In the mowing position the mower conditioner is located to the right of the towing vehicle, so that that towing vehicle does not drive over the uncut crop material.

Figure 3A:
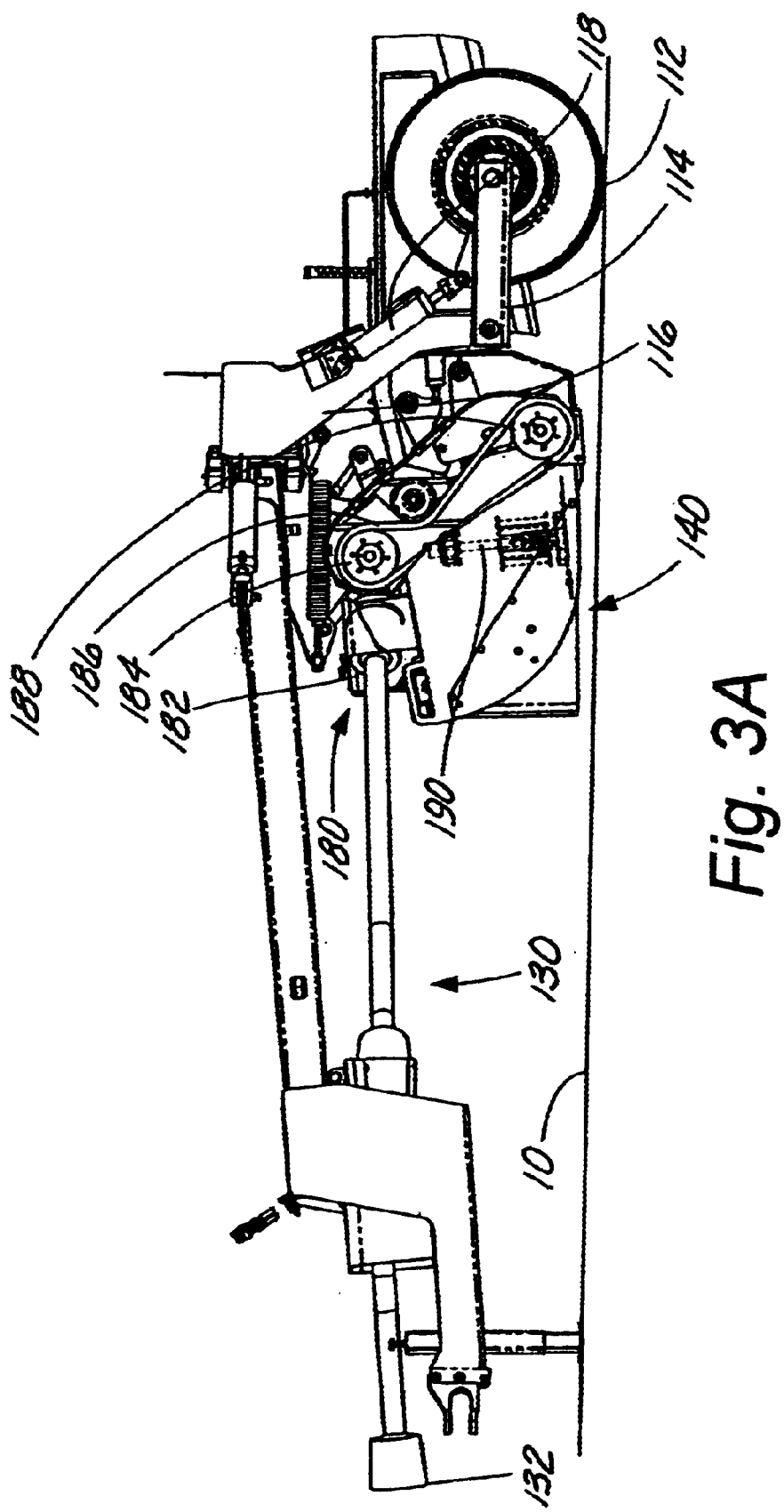
FIG. 3A is a right side end view with header in lowered position.
Figure 3B:
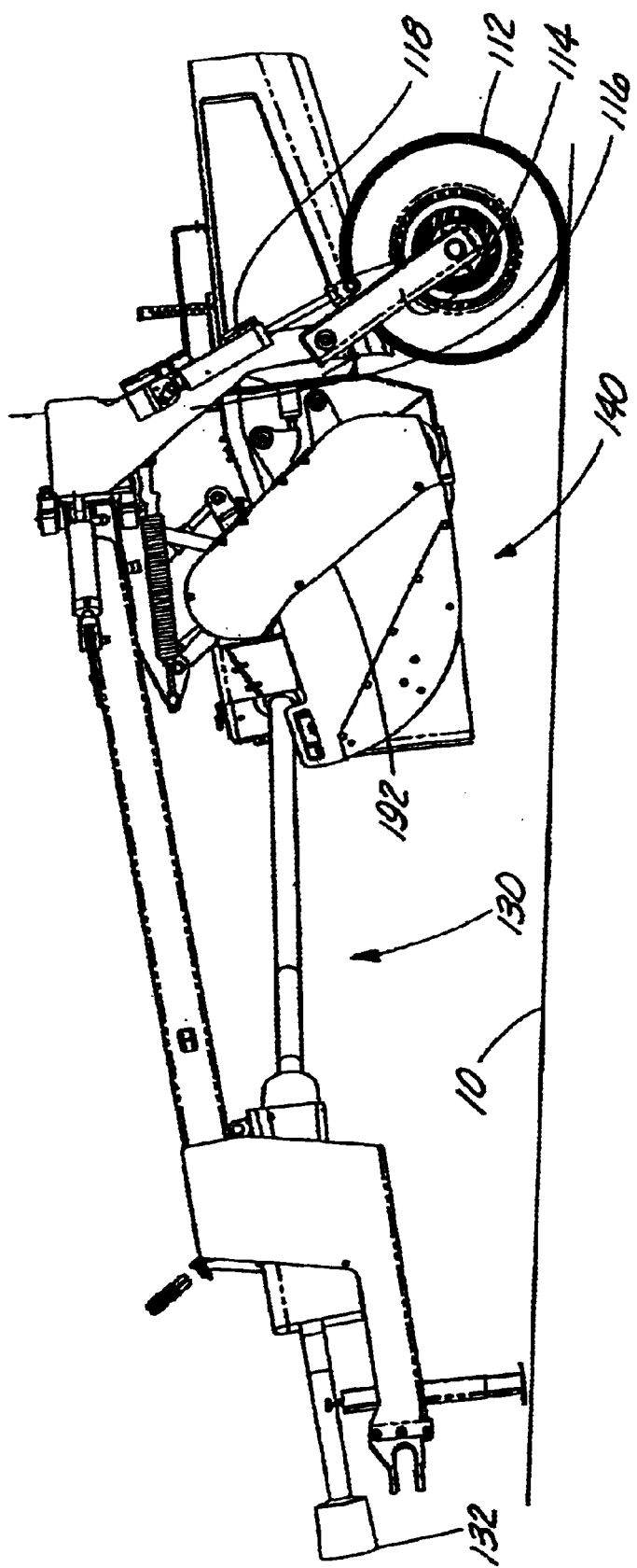
FIG. 3B is a right side end view with header in lowered position.

The drive assembly 130 is adapted, as can also be seen in FIGS. 3A and 3B, with a front coupler 132 that connects to the Power Take Off (PTO) shaft of the towing vehicle. It further includes drive shafts, and bearings required to transfer rotary power to the header assembly 140.

The main frame assembly 110 is adapted to control the position of the header assembly 140 as illustrated in FIGS. 3A and 3B. In FIG. 3A the header assembly 140 is positioned in an operating position, near to ground surface 10, while in FIG. 3B it is in a transport position raised off of the ground surface 10. To provide this control the main frame assembly 110 includes a pair of ground engaging wheels 112 mounted on wheel arms 114 that are pivotally connected to the main frame 116. Lift cylinders 118 control the angular orientation of the wheel arms 114 to the frame 116, controlling the height relative to the ground.

Figure 2:
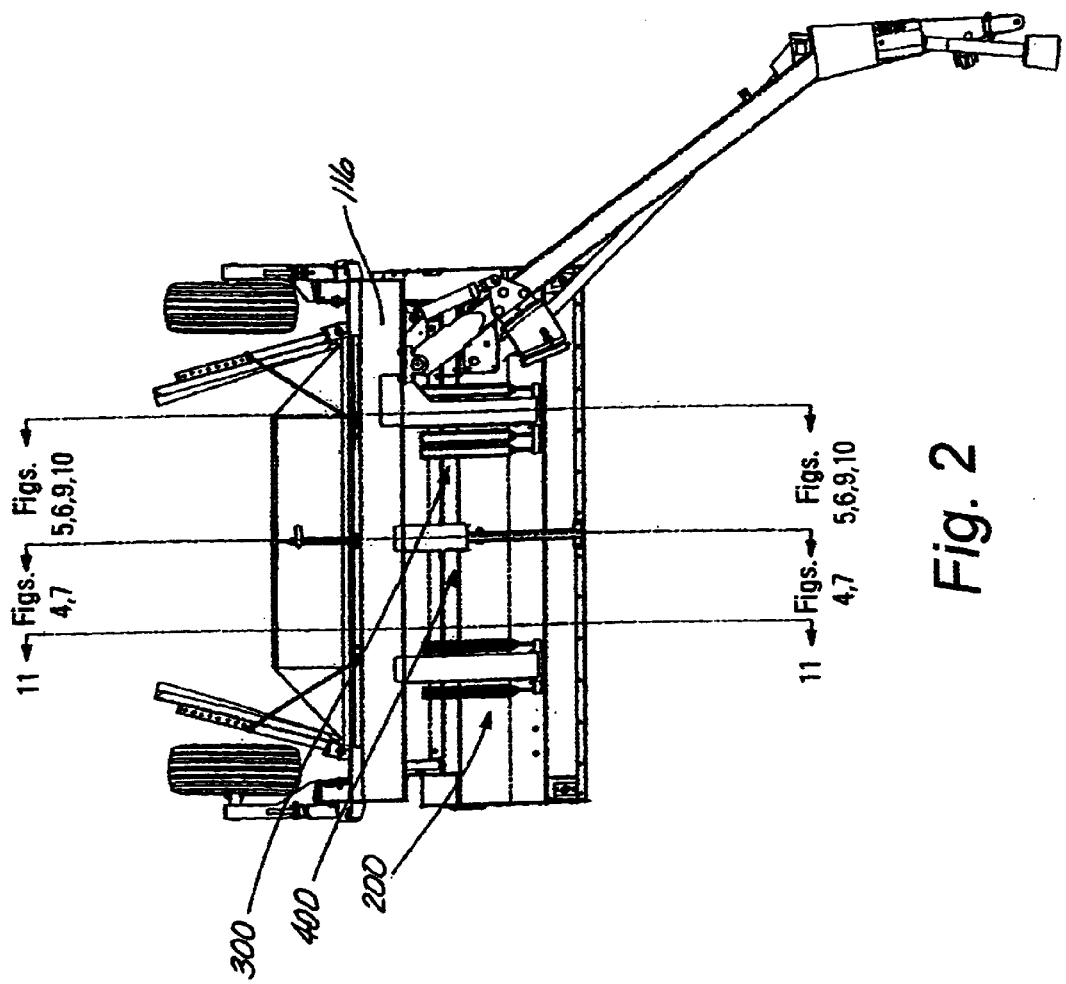
FIG. 2 is a top view of the overall machine
Figure 4:
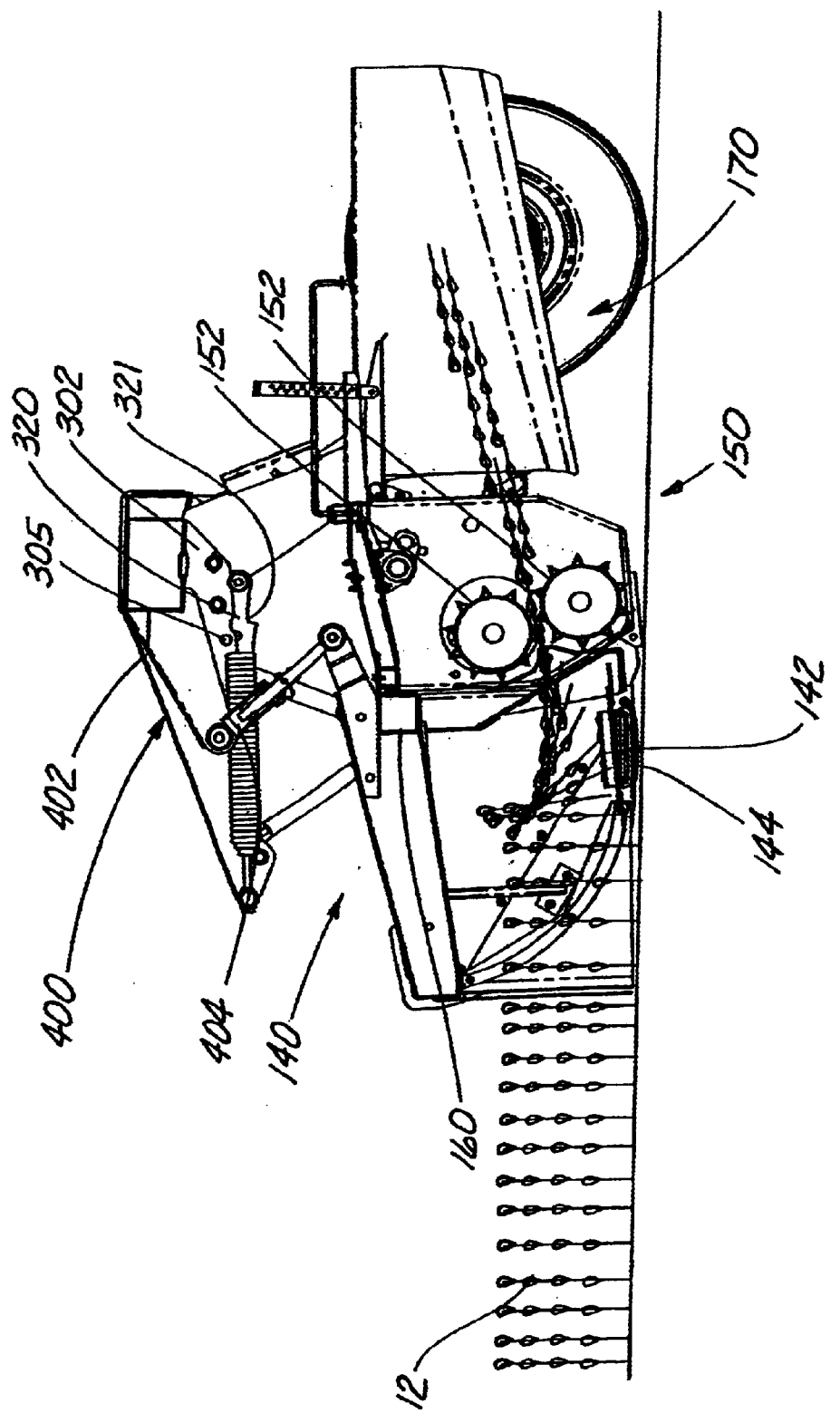
FIG. 4 is a cross section through the middle link with header in lowered position, tilted into normal mowing position.

The main components of header assembly 140, as illustrated in FIG. 4, include a cutter bar 142, conditioner assembly 150, header frame 160, and crop forming shield assembly 170. FIGS. 1, 2 and 3A further illustrate a drive system 180.

The cutter bar 142 is adapted to cut crop material. Many different types of cutter bars are known and can include, as examples, a sickle bar assembly or an assembly of rotating discs with cutting elements. The present invention is adaptable to any cutter bar.

The conditioner assembly 150, as illustrated, includes two ribbed conditioning rolls 152 that are positioned to pickup crop material 12 that has been cut by the cutter bar 142, processing the crop material and ejecting it towards the crop forming shield assembly 170. The crop forming shield assembly 170 deflects the cut crop forming the desired windrow. Other types of conditioning assemblies are known, including flail conditioners. The present invention is adaptable to any conditioner.

Header frame 160 is adapted to support the cutter bar 142, the conditioner assembly 150, crop forming shield assembly 170 and drive system 180. Drive system 180, as illustrated in FIG. 3A, includes a gearbox 182, drive pulley 184, drive belt 186, driven pulley 188, drive shaft 190. It further includes drive shielding 192 illustrated in FIG. 3B. The gearbox 182 is adapted to connect to the drive assembly 130, which transfers rotational power from the towing vehicle.

The gearbox 182 is further adapted with an output shaft onto which a drive pulley 184 is mounted. Drive pulley 184 powers a drive belt 186 which transfers power to the driven pulley 188 which transfers power to the conditioner assembly 150.

The gearbox 182 is further adapted with a second output shaft which adapts to drive shaft 190. In this embodiment the cutter bar is a series of rotating discs that are all interconnected. Drive shaft 190 provides the power directly to the cutterbar. If the cutterbar were of a sickle bar type, then drive shaft 190 would transfer power to a gearbox that powered the sickle bar.

FIG. 3B illustrates drive shielding 192 covering the pulleys 184 and 188 and the belt 186, which is located on the left side of the header assembly 140.

The components included in drive system 180 are most effectively located on the same side of the header assembly 140, in this embodiment, the left side. Their weight is significant, thus resulting in the fact that the header assembly 140 is not balanced, and the center of gravity will be left of the geometric center-line of the header assembly 140. If the header assembly 140 were detached from the frame assembly 110 and set on the ground, the ground pressure or ground force on the left side would be greater than on the right side. The ground pressure affects the performance of the header assembly 140.

In operation, the header assembly 140 is allowed to set on the ground as illustrated in FIG. 4 where skids 144, a component of header assembly 140, contact the ground 10. Skids 144 can be provided in various shapes to allow control of the cutting height. If the full weight of the header were allowed to simply set on these skids 144, while being propelled along the ground to cut the crop, the weight would be sufficient to cause several detrimental effects. These include an excessive power requirement to tow the mower conditioner, a tendency to gouge the ground, and the cutterbar would be at risk of being damaged when encountering an obstacle. Thus a suspension is provided to suspend a portion of the weight of the header assembly 140 on the frame assembly 110 where it is carried by the wheels 112 and towing vehicle.

The components of the suspension are illustrated in FIG. 2, including the right suspension assembly 200, left suspension assembly 300 and center suspension assembly 400. For the sake of clarity each assembly is defined as having a sub frame; each sub frame being affixed to the main frame 116. In this preferred embodiment they are illustrated as being welded, however any joining technique could be utilized, including bolting. In an alternate definition, these subframes may be defined as part of the main frame 116.

Figure 7:
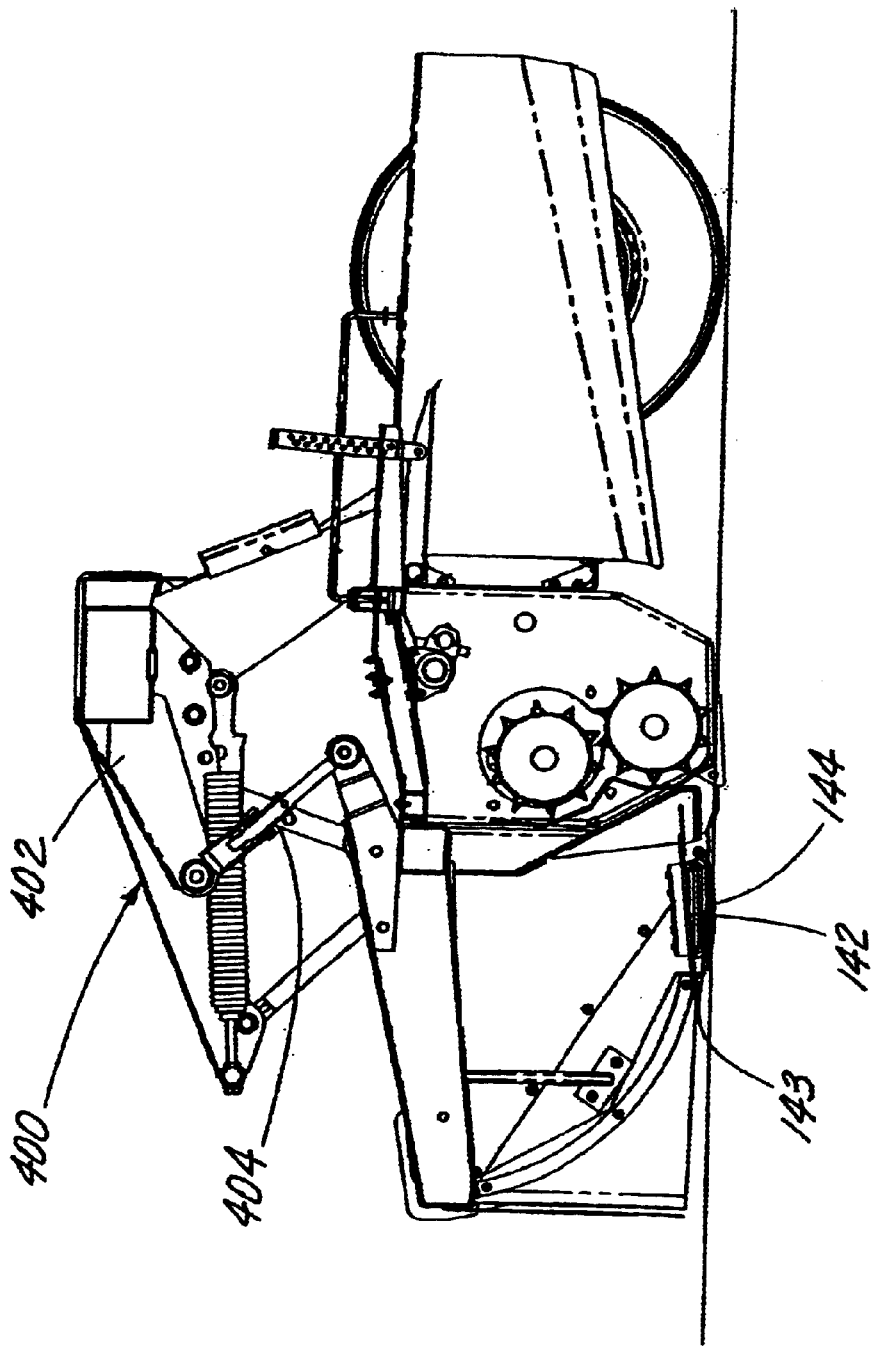
FIG. 7 is same as FIG. 4 with header in lowered position, tilted up.

The center suspension assembly 400 is illustrated in FIGS. 4 and 7 and includes a center sub frame 402 and a center link 404. The center link 404 is adjustable in length to allow control of the orientation of the header assembly 140. When it is lengthened with the header assembly 140 setting on the ground, as illustrated in FIG. 7, the header assembly 140 effectively pivots clockwise around the skid 144 thus raising the cutting edge 143 of the cutterbar 142. This results in the crop being cut higher. When shortened, as illustrated in FIG. 4, the exact opposite effect results in the crop being cut shorter.

Figure 8:
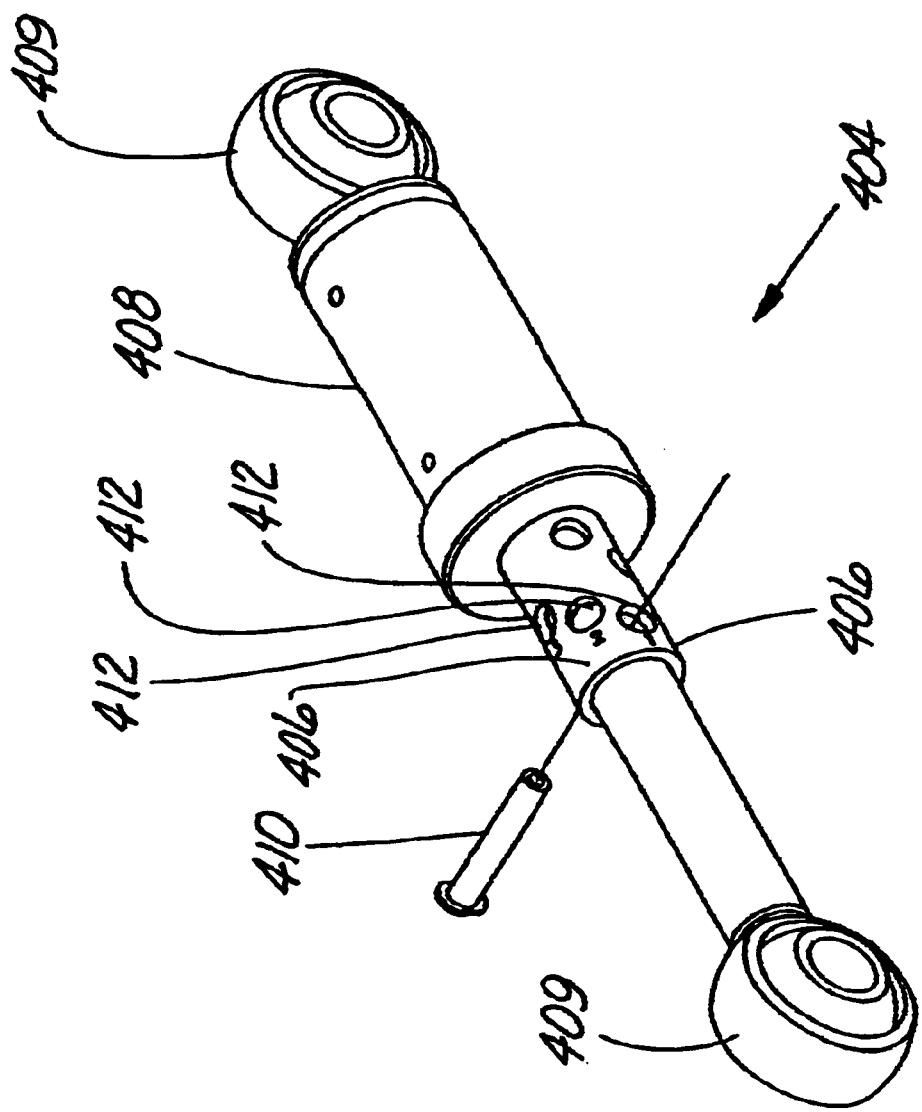
FIG. 8 is a drawing of the tilt cylinder with adjustment bushing.

In the preferred embodiment, as illustrated in FIG. 8, the center link 404 includes a hydraulic cylinder 408, including a ball and socket 409 on each end. Center link 404 further includes adjustment tube 406, and stop pin 410. The stop pin 410 passes through a hole in the rod of the hydraulic cylinder 408, and one of a multiple of available holes 412 on the adjustment tube 406. The adjustment tube 406 bottoms-out on the body of the cylinder 408 defining the retracted length of the cylinder 408. The retracted length, and thus the cutting height of the cutter bar 142 is thus defined by the positioning of the pin 410 in the adjustment tube. In this manner the center suspension assembly 400 has an effect on the orientation of the cutter bar 142, and thus the cutting height of the mower conditioner 100. It has minimal effect on the ground pressure.

The ground pressure is controlled by the right suspension assembly 200 and left suspension assembly 300. The assemblies are similar, with similar components performing similar functions. The following description focuses exclusively on the left assembly. A similar description could be included for the right assembly, but is omitted for the sake of reducing duplication.

Figure 5:
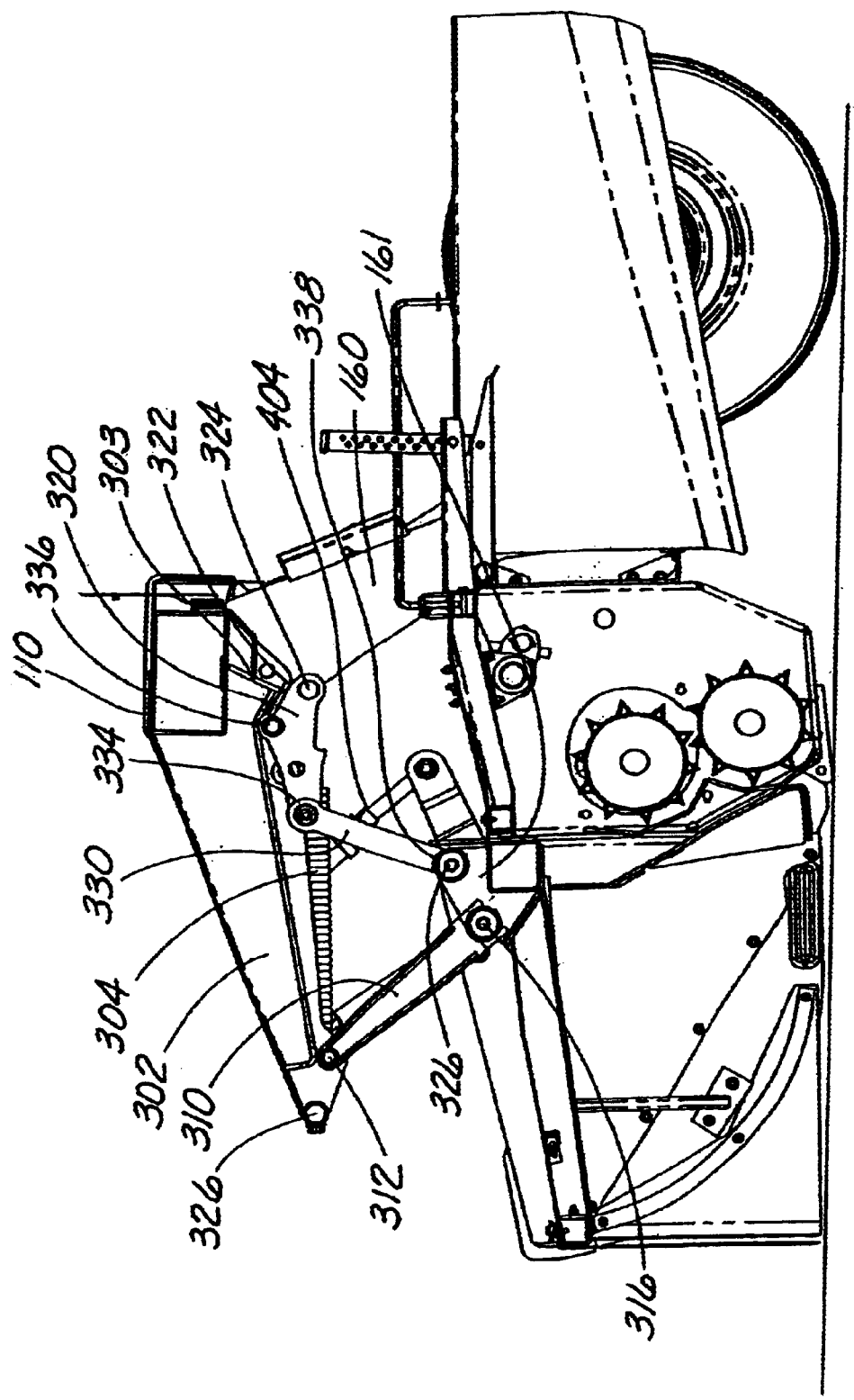
FIG. 5 is a cross section through the left side suspension assembly with header in lowered position.
Figure 6:
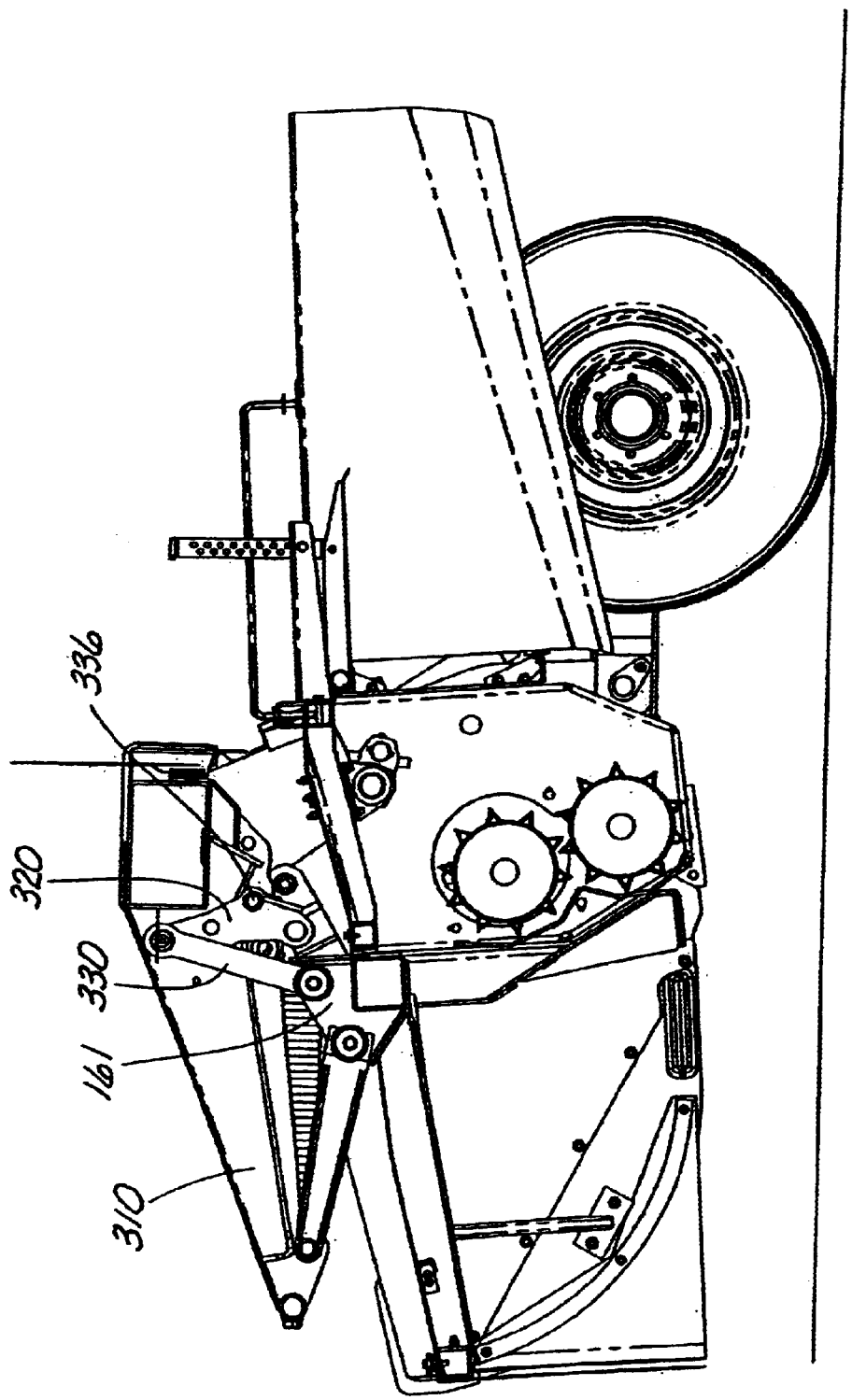
FIG. 6 is same as FIG. 5 with header in raised position.

The main components of the left suspension assembly 300 are illustrated in FIGS. 5, and 6. These include a suspension sub-frame 302, extension springs 304, a suspension link assembly 310, a rocker arm 320, and a lift arm assembly 330.

Figure 13:
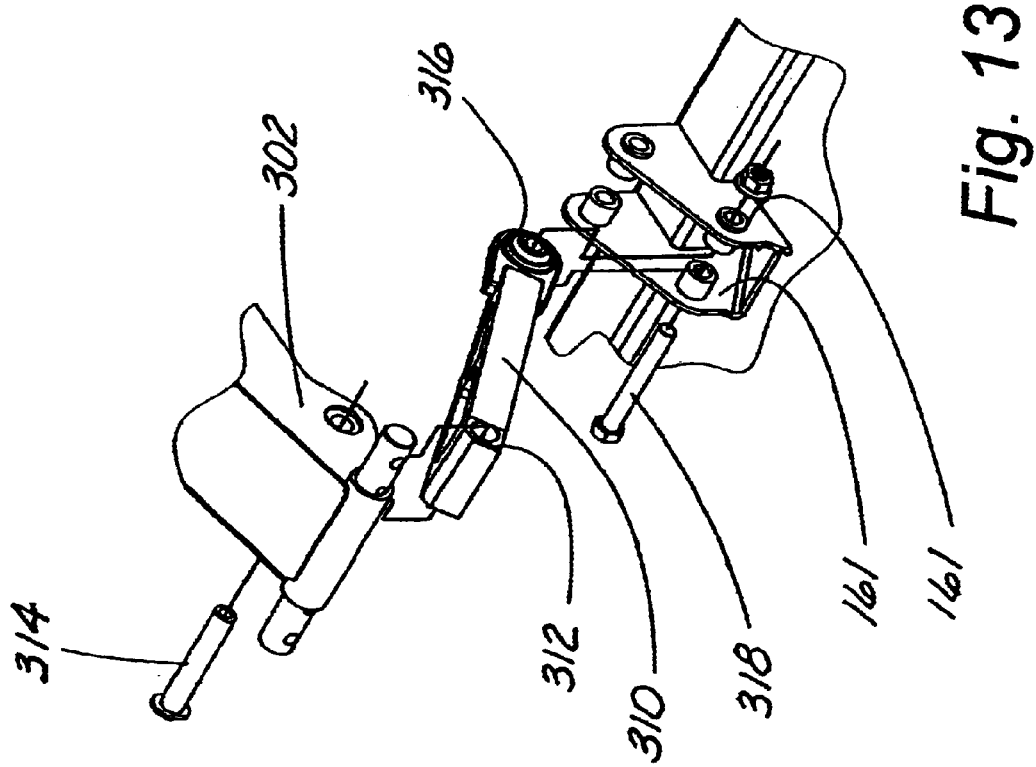
FIG. 13 is an exploded isometric view showing the front suspension link and related components.

The suspension link assembly 310 and its mounting onto the suspension sub-frame 302 are illustrated in detail in FIG. 13. The suspension link assembly 310 includes a main pivot aperture 312 adapted to pivot on pivot pin 314 which passes through two holes in the suspension sub-frame 302. Main pivot aperture 312 is long, as compared to the diameter of the pivot pin 314, and the joint clearance is minimized, providing a pivot joint that only allows the suspension link assembly 310 to pivot around the axis of the pivot pin 314. In this manner this link is not allowed to sway, or move in any other directions, and in this manner the suspension link will stabilize the header assembly 140.

On the opposite end of the left suspension link 310 is a ball and socket joint 316. This component includes an inner bore that accepts a bolt 318. The bolt 318 passes through holes in a pair of ears 161, as also illustrated in FIG. 1, a component of the header frame 160. Pin 318 locks the inner bore of the ball and socket joint 316 to the header assembly 140. The ball and socket joint 316 allows the pin 318 additional degrees of freedom necessary to allow the left side of the header assembly to move independently from the right side. The independent movement is further enabled by a difference in the way that the suspension link assembly for the right side is constructed. The right side suspension link assembly includes ball joints on both ends, unlike the left suspension link assembly 310 which includes the pivot aperture 312 on one end.

FIG. 5 illustrates the four bar link assembly which attaches the header assembly 140 to the main frame assembly 110 defined by: 1) the suspension (first) link 310, 2) the center (second) link assembly 404, 3) suspension sub-frames 402 and 302 and 4) frame 160. This four bar link allows the header assembly 140 to move relative to the main frame assembly 110 in a manner that the orientation of the header assembly relative to the ground remains substantially consistent. This consistency is due to the arrangement of the components such that the suspension (first) link 310 and center link assembly 404 are nearly the same length, and are substantially parallel. Thus, as the header assembly 140 is raised, by contacting an obstacle for instance, its orientation and the associated cutting characteristics do not change.

The components of the suspension, thus far described, are capable of holding the header assembly 140 in position relative to the frame assembly 110 without swaying from left to right. They also allow the header assembly 140 to be raised and lowered relative to the frame assembly 110 in a manner that its orientation is not affected. With these components installed the header assembly would swing down until both the suspension (first) link 310 and center (second) link assembly 404 were vertical. The rocker arm 320 and lift arm assembly 330 (FIG. 6) are provided to control the vertical position of the header assembly 140 relative to the main frame assembly 110. The following describes the function of rocker arm 320 and lift arm assembly 330, including its function to control the ground pressure by suspending a portion of the weight of the header assembly.

Figure 12:
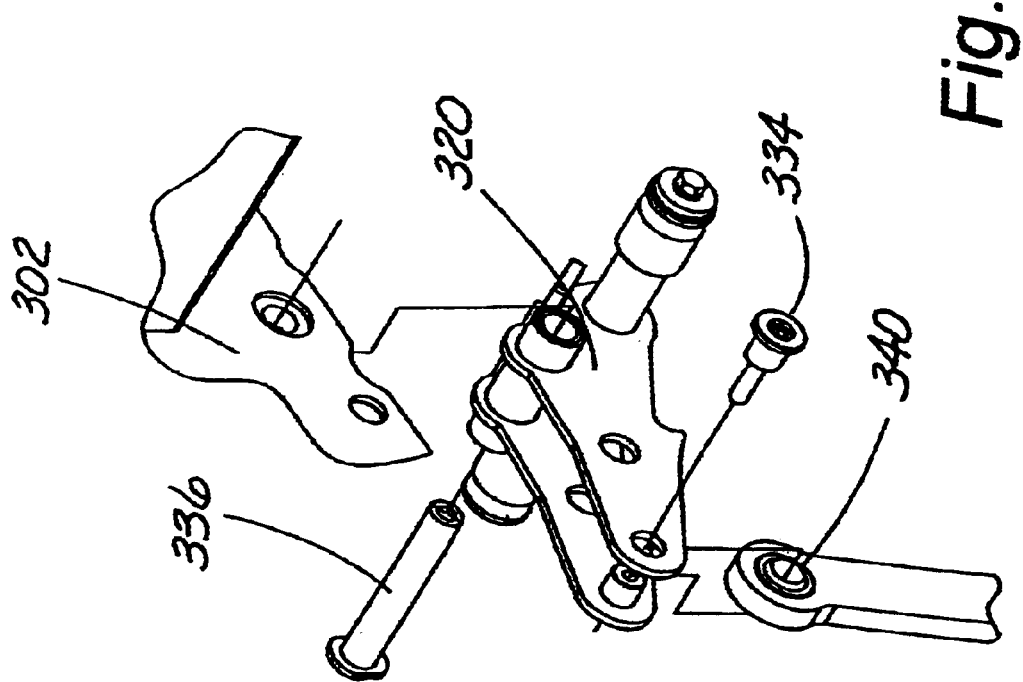
FIG. 12 is an exploded isometric view of the rocker arm and related components.

Looking to FIG. 5 the lift arm assembly 330 is illustrated attaching to rocker arm 320. Lift arm 330 includes a ball and socket joint on each end. The bottom ball and socket joint 338 engages a bolt 326, as illustrated in FIG. 1, which passes through the paired ears 161 of the header frame 160. The top ball and socket joint 340, as illustrated in FIG. 12, engages a pin 334 which passes through two holes of the rocker arm 320. The rocker arm 320 is supported on, and pivots around rocker pin 336 that passes through two holes in the sub frame 302. As illustrated in FIG. 5, rocker arm 320 can rotate counter-clockwise around pin 336 until plate 322 contacts stop plate 303, a component of the suspension sub-frame 302. In the position as drawn in FIG. 5, the rocker arm 320 is prevented from rotating counter clockwise. In this position rocker arm 320 is holding lift arm 330 defining the lowest position of header assembly 140 relative to the main frame assembly 110.

Figure 11:
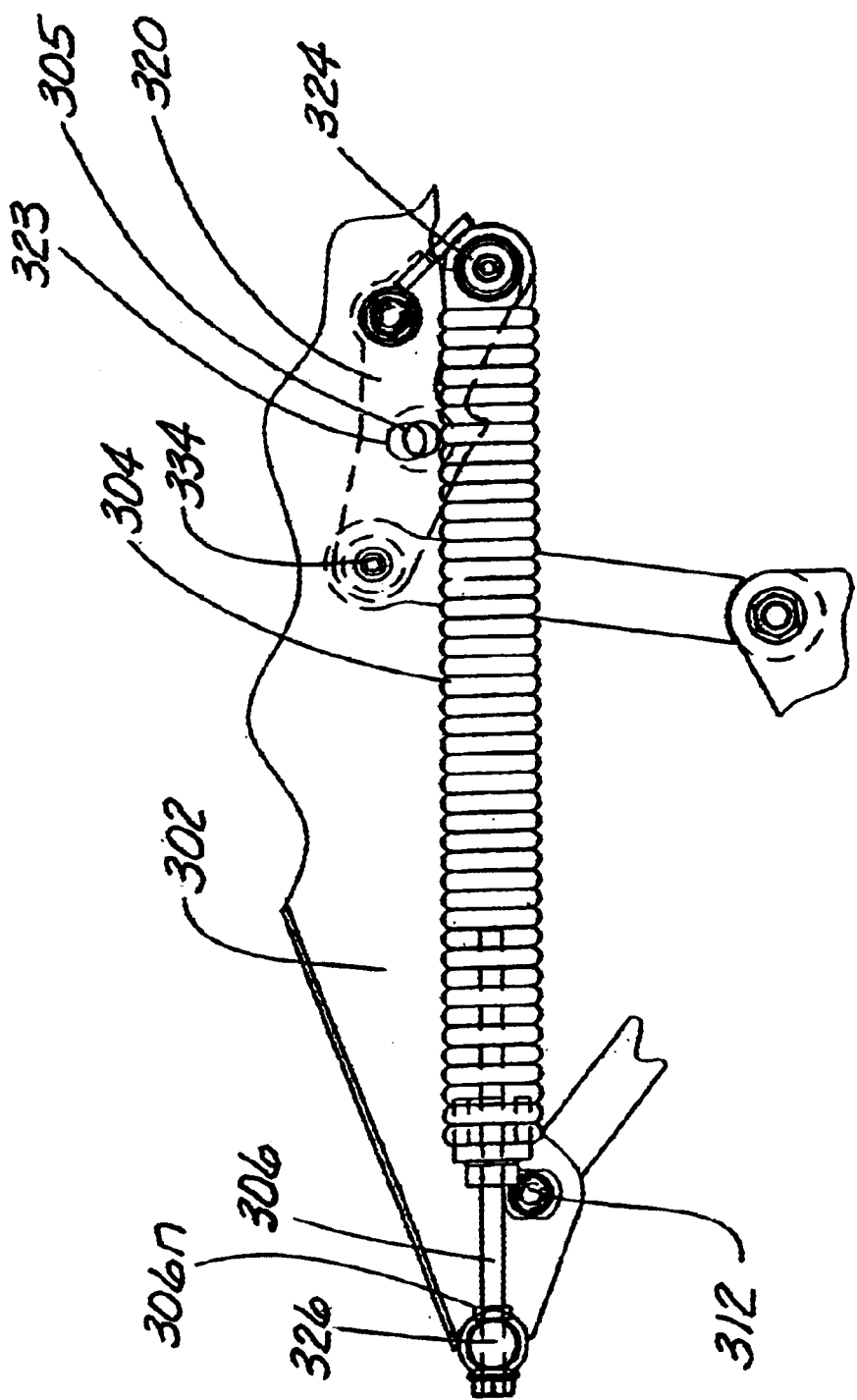
FIG. 11 is a side view of the right suspension assembly, as defined in FIG. 2.

In addition to being held from rotating counter clockwise, by the stop plate 303 contacting plate 322, there is a spring force applied to the rocker arm 320 that is attempting to rotate it clockwise. FIG. 11 illustrates spring shaft 324 which is connected to the rocker arm 320 in a manner such that the tube can rotate relative to the rocker arm 320. Extension springs 304 are attached to the spring shaft 324 on one end and to a spring anchor shaft 326 on the other end. The left sub-frame 302 supports the spring anchor shaft 326.

Figure 14:
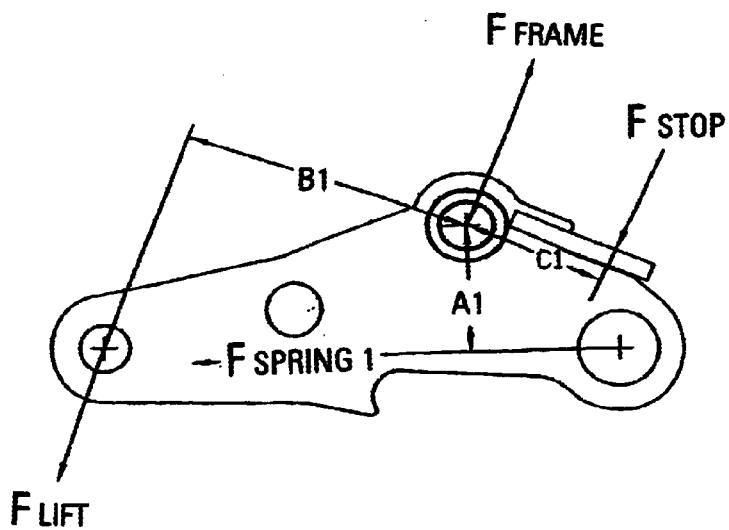
FIG. 14 is a free-body diagram of the rocker arm in the normal operating position.

The free body diagram of the left rocker arm 320, in the position as illustrated in FIG. 5, as it pivots around the rocker pin 336 is illustrated in FIG. 14. The forces acting on the rocker arm include the spring force $F_{spring1}$, the lift force $F_{lift}$, the frame force $F_{frame}$ and the stop force $F_{stop}$. The lift force will affect the ground pressure, the force of the header assembly on the ground, or ground force. Basically the ground force plus the lift force will equal the weight of the header assembly. There will be a preferred ground force, that is dependent on the preferences of the individual operator. To allow that adjustability, the spring force $F_{spring}$ can be adjusted by modifying the length of the spring 304 by adjusting a threaded rod 306 as illustrated in FIG. 11 by moving the nut 306 in, for example, between the solid line and dashed line positions thereof. Prior to operation an operator may adjust the spring length.

Figure 15:
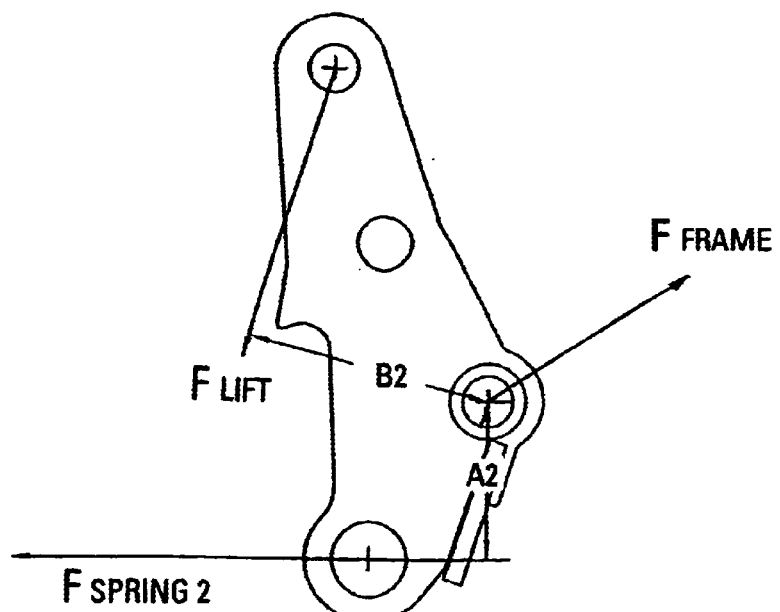
FIG. 15 is a free-body diagram of the rocker arm in a deflected position.

In operation, the header assembly 140 will encounter obstacles where the header assembly 140 needs to be raised in order to pass over the obstacle. This raised condition is illustrated in FIG. 6, and the resulting orientation of the rocker arm 320, for this raised condition, illustrated in FIG. 15.

The ideal load characteristic would be a substantially constant ground force, as the header is raised. This would then require that the lift force be substantially constant. With the arrangement of the preferred embodiment of the present invention an improved load profile, approaching the ideal, can be achieved. This results from facts including:

1) as an extension spring 304 retracts it losses spring force, thus $F_{spring1}$ is greater than $F_{spring2}$ 2) A1 is less than A2 thus $(F_{spring1})(A1)$ can approximately equal $(F_{sping2})(A2)$ 3) the lift arm 330 is positioned such that as the header is lifted its bottom end swings up and back with the header, as defined by the configuration of the previously described four-bar link, and its upper end also moves up and back such that its orientation relative to the ground remains substantially consistent. This fact results in minimizing the change in effective moment arms; B1 vs B2. Thus the overall effect is that the ground pressure characteristics can be customized by the design of the rocker arm 320 in conjunction with the design of the four-bar linkage, the lift arm 330 and spring 304.

The mower conditioner 100, as previously described, includes a left and right suspension assembly 300 and 200. The header assembly 140 has been previously described as being unbalanced, as a result of the drive components being located on the left side. An additional feature of the suspension system of the present invention is that the suspension characteristics of the right suspension assembly 200 can be modified as compared to the suspension characteristics of the left suspension assembly 300. In the preferred embodiment there are three springs in the left suspension assembly, and only two springs in the right suspension assembly. In addition the shape of the rocker arm 320 in the left suspension assembly is different than the rocker arm in the right suspension assembly, effectively modifying B1 and B2 as identified in FIGS. 14 and 15. These and other modifications can be made to adjust the lift characteristics in order to balance the header assembly 140 such that the ground force or ground pressure is constant across its length.

The rocker arm 320, in addition to being an integral component enabling this enhanced load characteristic, provides additional functions. One such function is the ability to provide an alternate operating position. The normal operating configuration is illustrated in FIG. 5 with the lowest position of the header 140 assembly being defined when plate 322 contacts stop plate 303 defining the position of the rocker arm 320. In normal operation, the header 140 would typically be lowered until the header first contacts the ground and then until the rocker arm 320 rotates slightly clockwise, defining the normal operating position. This will result in the header 140 exerting the desired ground pressure, and will allow the header 140 to move lower in the event the ground conditions include dips.

Figure 9:
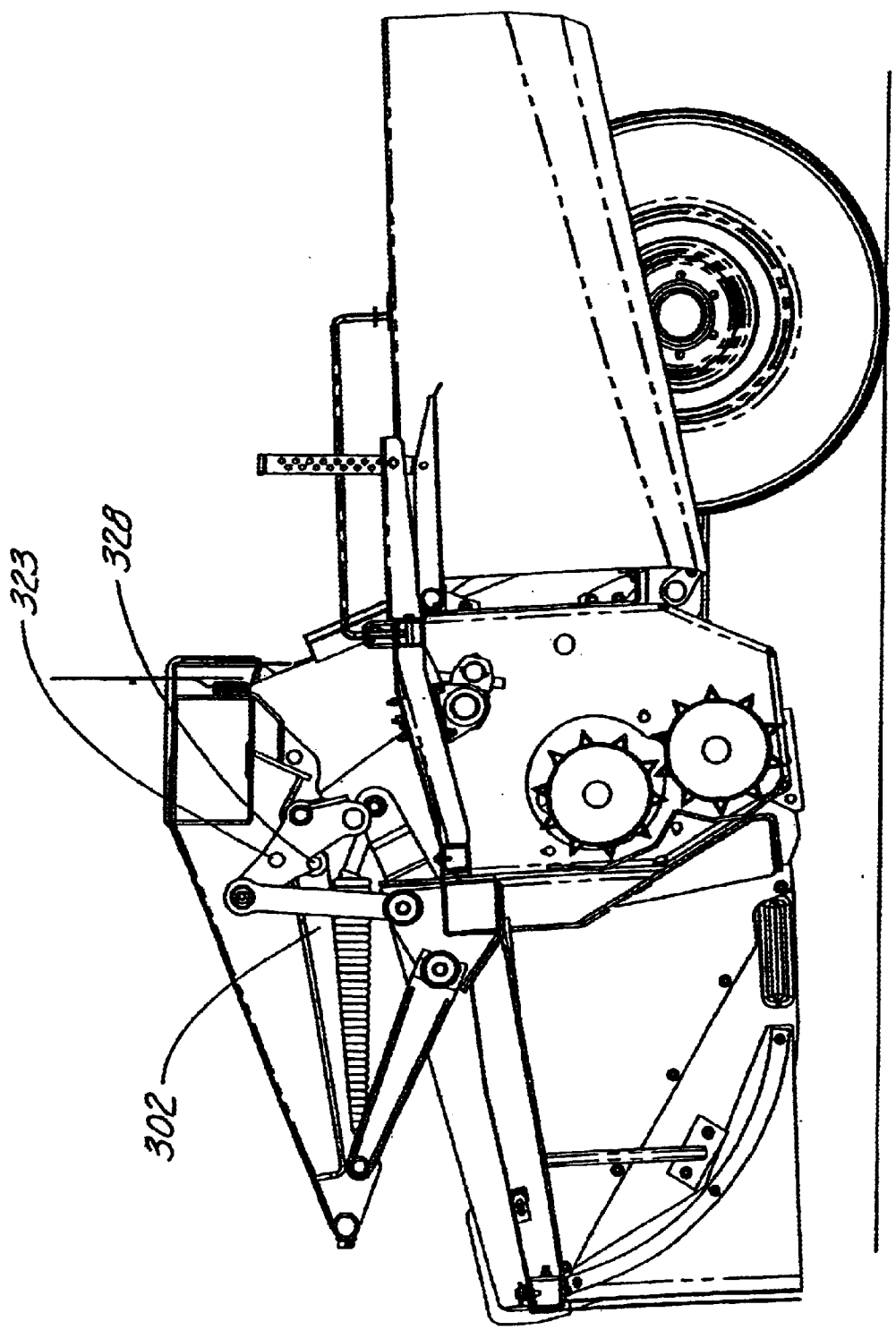
FIG. 9 is same as FIG. 5 with stop pin inserted for higher mowing.

FIG. 9 illustrates the alternate operating position, where the header frame 140 has been stopped at a higher position relative to the frame. This configuration would be desirable for situations where it is desirable to leave a tall stubble, where the crop material is not cut closely to the ground. This configuration is achieved by inserting pin 328 through two holes 305 in the sub-frame 302, which can be seen in FIGS. 4 and 11. Pin 328 will engage a notched portion 321, which can also be seen in FIG. 4, of rocker arm 320 such that it cannot rotate as far counterclockwise as before.

Figure 10:
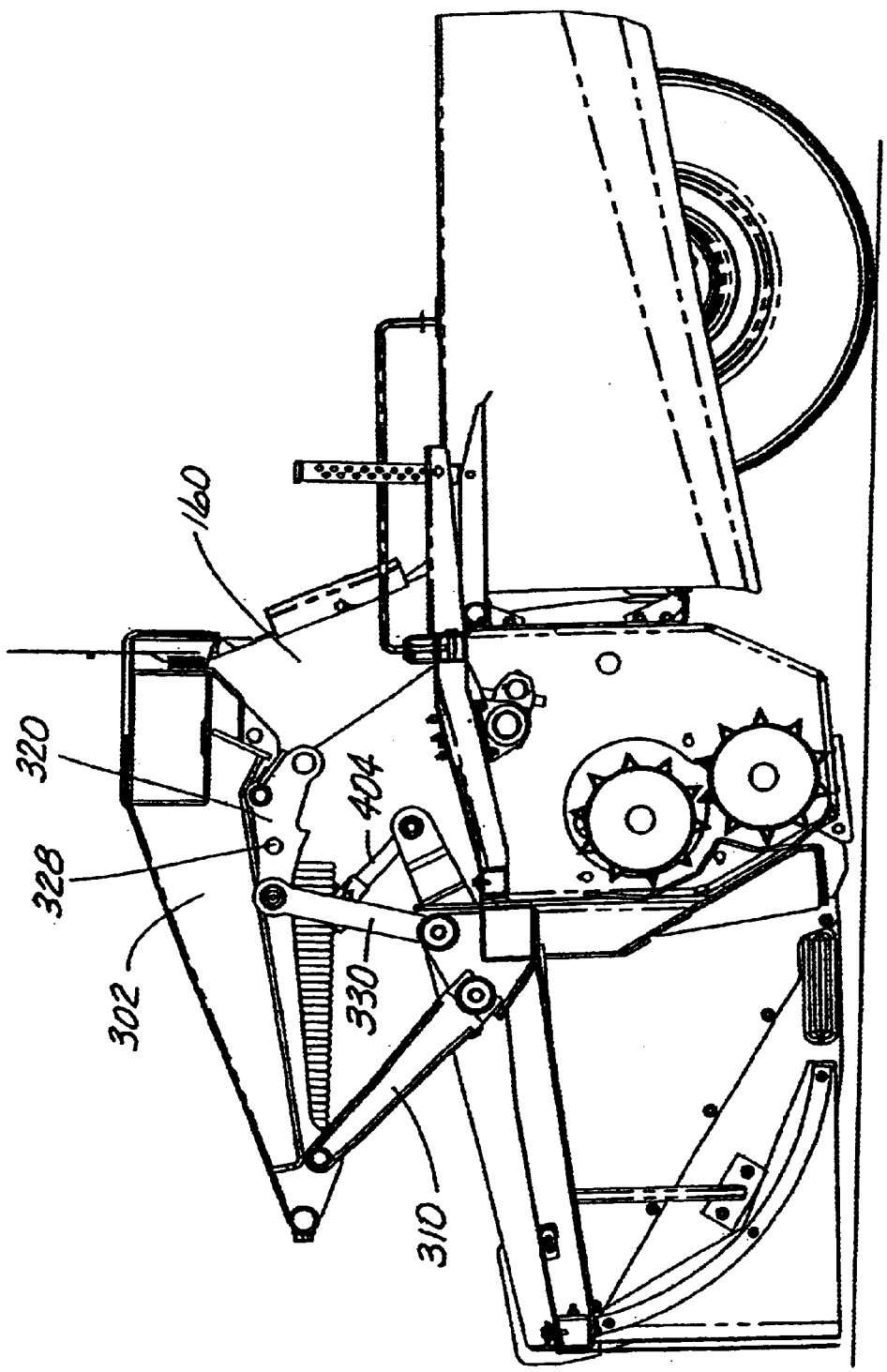
FIG. 10 is same as FIG. 9 with stop pin inserted for the manufacturing position.

Another function is to provide a shipping position. This is provided by locking the position of the rocker arm 320 relative to the suspension sub-frame 302. FIG. 10 illustrates pin 328 inserted through holes 305 in the suspension sub-frame 302 engaging a hole 323, which can be seen in FIG. 11, in the rocker arm 320 that locks the rocker arm relative to the suspension sub-frame 302.

The embodiments of the present disclosure may be used in a variety of applications. For example, the suspension system as detailed in the preferred embodiment is adapted to a pull-type mower conditioner, it could likewise be adapted to a self-propelled mower with the header assembly mounted in front of a prime mover.

In addition, it is obvious that many other modifications and variations of the present invention are possible in light of the above teachings. It is therefore to be understood that, within the scope of the appended claims, the invention may be practiced otherwise than as specifically described.

What we claim is:

1. A harvesting machine with a main frame, adapted to be raised and lowered between a transport position and a harvesting position, a harvesting header having a first end and a second end and a suspension system for supporting the harvesting header from above, the suspension system comprising:

a suspension assembly connected to the main frame comprising a suspension frame defining a first and a second pivot point with a first link pivotally connected to the suspension frame at the first pivot point at its first end and pivotally connected to the harvesting header at its second end, with a rocker arm pivotally connected to the suspension frame at the second pivot point, with an extension spring connected to the suspension frame at a point near the first pivot point and also connected to the rocker arm, with a suspension lift bar pivotally connected to the rocker arm at its first end and pivotally connected to the harvesting header at its second end;

a second link operatively pivotally connected to the main frame at a first end and operatively pivotally connected to the harvesting header at a second end; and wherein the first link and the second link are substantially parallel and angled from vertical with the suspension lift bar at its lowered position, as defined by a stop that prevents rotation of the rocker arm and defines the lowest position of the harvesting header relative to the main frame, exerting a lift force onto the harvesting header that counteracts the weight of the harvesting header such that a ground weight, less than the weight of the header, is required to lift the header upwards, the ground weight being substantially constant as the harvesting header moves from the bottom position to any lifted position.

2. The suspension system as in claim 1 comprising a first and second suspension assembly, the first suspension assembly being located near a first end of the harvesting header and the second suspension assembly located near the, second end of the harvesting header, and the second link being located near the middle of the harvesting header.

3. The suspension system as in claim 2 wherein the first and second suspension assemblies are configured differently such that the lift force generated by the suspension lift arm of the first suspension assembly is different than the lift force generated by the suspension lift arm of the second suspension assembly.

4. The suspension system as in claim 3 wherein the difference in configuration involves different springs.

5. The suspension system as in claim 3 wherein the difference in configuration involves a difference in the rocker arm.

6. The suspension system as in claim 1 wherein the said stop of the suspension assembly further includes a removable pin that defines an alternate lowered position.

7. The suspension system as in claim 1 wherein said suspension assembly further includes a removable pin that prevents rotation of the rocker arm.

8. The suspension system as in claim 1 wherein the second link comprises a hydraulic cylinder that can be adjusted in length to control the orientation of the harvesting header.

9. The suspension system as in claim 8 wherein the hydraulic cylinder further includes a sleeve with multiple holes and a removable pin that engages the holes of the sleeve and a hole in the cylinder rod allowing the retracted length of the cylinder to be adjusted.

10. A harvesting machine with a main frame, a harvesting header having a first end and a second end and a suspension assembly operatively attached to said main frame for supporting the harvesting header from above, said harvesting header having a lowered position and a raised position, the suspension assembly comprising:

a suspension frame;

a rocker arm operatively pivotally attached to said suspension frame at along a first substantially horizontal axis, said rocker arm having an upper position and a lowermost position;

a first link operatively pivotally attached to said suspension frame along a second substantially horizontal axis and operatively pivotally attached to said harvesting header (140) at the other end thereof;

a second link operatively pivotally attached to said main frame along a third substantially horizontal axis and operatively pivotally attached to said harvesting header at a fourth substantially horizontal axis, said second link being disposed substantially always parallel to said first link;

a suspension lift bar operatively pivotally attached to said rocker arm and operatively pivotally attached to said harvesting header, said suspension lift bar being disposed not parallel with respect to said first link; and a biasing member operatively attached to said suspension frame and operatively attached at the other end thereof to said rocker arm for exerting a lift force on said rocker arm toward the upper position thereof.

11. The suspension system of claim 10, further comprising a force adjusting device operatively attached to the biasing member for adjusting the lift force on said harvesting header to counteract the weight of the harvesting header such that the effective ground weight of the harvesting header, less than the weight of the header, is required to lift the header upwardly and to permit the ground weight to be maintained substantially constant as the harvesting header moves between the lowered and the raised position thereof.

12. The suspension system as in claim 10 comprising a first and second suspension assembly, the first suspension assembly being located near a first end of the harvesting header and the second suspension assembly located near the, second end of the harvesting header, and the second link being located near the middle of the harvesting header.

13. The suspension system as in claim 12 wherein the first and second suspension assemblies are configured differently such that the lift force generated by the suspension lift bar of the first suspension assembly is different than the lift force generated by the suspension lift bar of the second suspension assembly.

14. The suspension system as in claim 13 wherein the difference in configuration involves different springs.

15. The suspension system as in claim 13 wherein the difference in configuration involves a difference in the rocker arm.

16. The suspension system as in claim 10 wherein the said stop of the suspension assembly further includes a removable pin that defines an alternate lowered position.

17. The suspension system as in claim 10 wherein said suspension assembly further includes a removable pin that prevents rotation of the rocker arm.

18. The suspension system as in claim 10 wherein the second link comprises a hydraulic cylinder that can be adjusted in length to control the orientation of the harvesting header.

19. The suspension system as in claim 18 wherein the hydraulic cylinder further includes a sleeve with multiple holes and a removable pin that engages the holes of the sleeve and a hole in the cylinder rod allowing the retracted length of the cylinder to be adjusted.

* * * * *